UNITED STATES PATENT OFFICE.

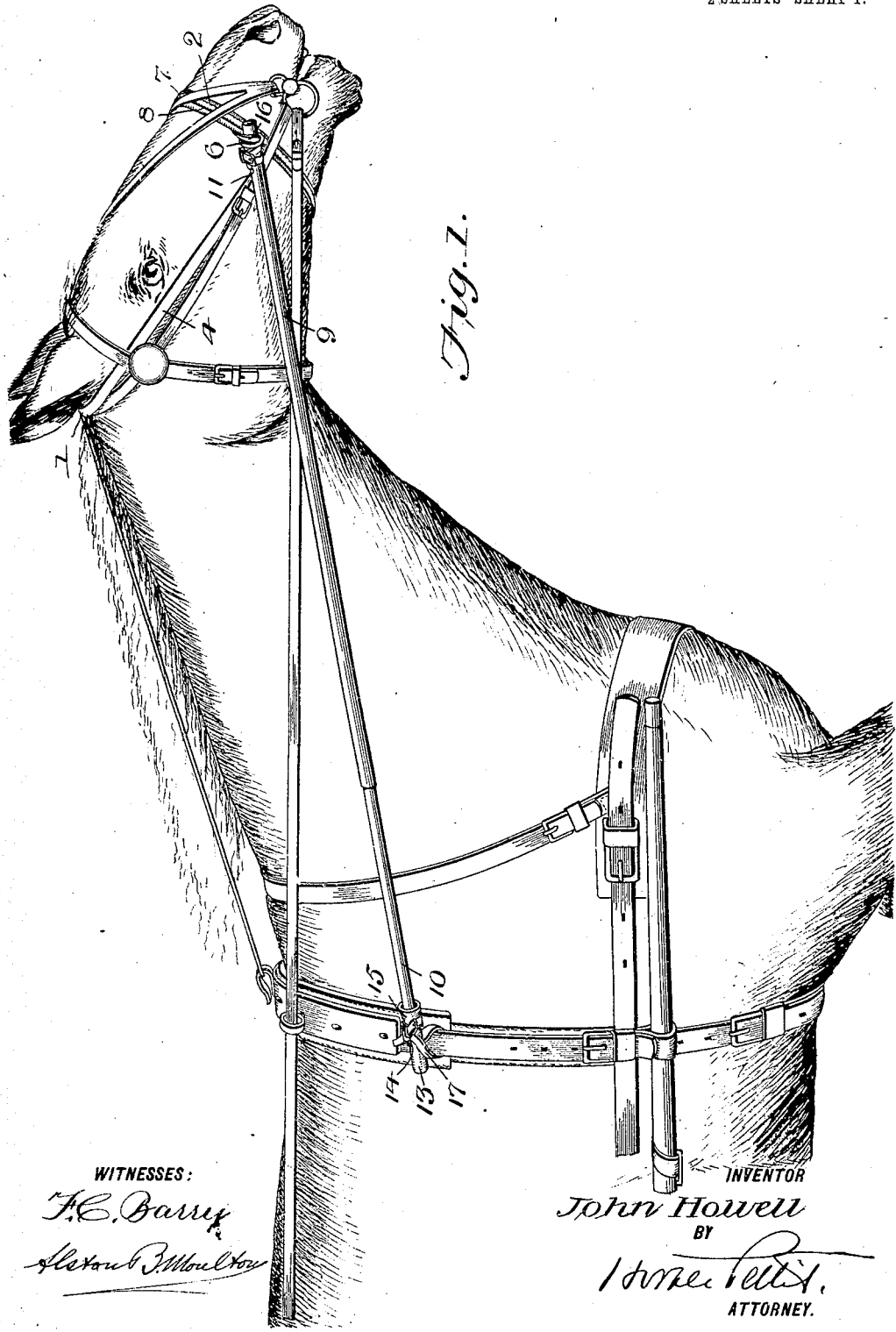

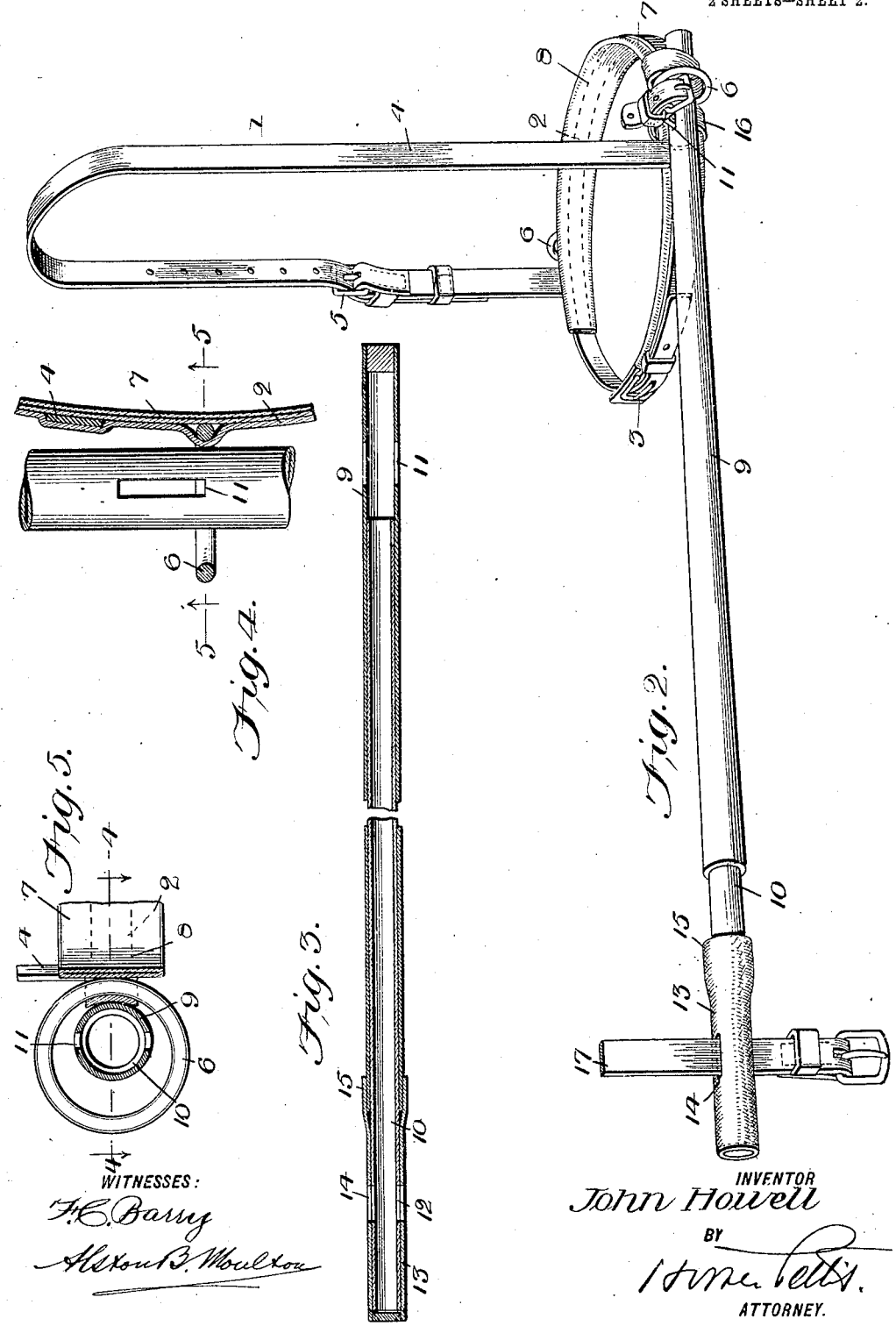

JOHN HOWELL, OF NEW YORK, N. Y.

CONTROLLING DEVICE.

No. 872,347.      Specification of Letters Patent.      Patented Dec. 3, 1907.

Application filed November 15, 1905. Serial No. 287,408.

*To all whom it may concern:*

Be it known that I, JOHN HOWELL, a citizen of the United States, and a resident of New York, county and State of New York, have invented new and useful Improvements in Controlling Devices, of which the following is a full, clear, and complete disclosure.

Many highly strung horses have a habit of holding the head side-wise while being driven, and this habit may be caused from a disposition on the part of the horse to see what is behind it or to draw its head away from another horse of a pair driven together. This greatly detracts from the style and general appearance of the animal, and, moreover, greatly affects its speed, since the highest speed is only attainable when the head is held straight, or in line with the rest of the body.

My invention relates to devices for controlling the position in which a horse is permitted to hold its head, and for preventing the horse from holding its head in the above mentioned undesirable position, and has for its object the construction of a simple and effective device which will compel a horse to assume a position most favorable to speed attainment and general appearances.

A further object of my invention is the construction of a device, which, when in use, is almost unnoticeable, is easily adjustable, which permits the horse to move its head in any direction except side-wise or laterally, and which does not injure or interfere, in any way, with the comfort of the animal.

For a further disclosure of my invention, reference may be had to the accompanying drawings forming a part of the specification in which Figure 1 is a view of my device in position, showing its relation to the harness and to the body of the horse; Fig. 2 is a perspective view of my device by itself; Fig. 3 is a central longitudinal section through the controlling rod; Fig. 4 is a section of the cheek band taken on line 4—4 of Fig. 5; and Fig. 5 is a section of the cheek band and controlling rod taken on the line 5—5 of Fig. 4.

My device consists of a head gear 1, comprising a cheek band 2, provided with the buckle 3 for adjusting and securely fastening the same near the horse's cheek. The cheek band is supported on the head of the horse by the head strap 4 passing upwardly behind the ears and adjusted by means of the buckle 5. On either side of the cheek band, are rings 6, secured to the sides of the cheek band in any suitable manner. I preferably, however, provide the inside of the cheek band 2, with a widened bearing surface 7 stitched as at 8, and secure the rings 6 at the sides of the cheek band between the band 2 and widened or cushioned portion 7 as plainly shown in Figs. 4 and 5.

My controlling rod consists of the telescoping members 9 and 10, each of which is provided adjacent its outer end with openings, the opening 11 being adjacent the end of the member 9 and the opening 12 adjacent the end of the member 10. One of the said members is provided at its end with a cap or socket 13, having an opening 14 corresponding to the opening 12 of the tube 10. The inner end of said cap is enlarged as at 15 to permit the inner end of the member 9 to telescope within it, as plainly shown in Fig. 3, when the controlling rod is reduced to its smallest compass, the end of the rod 9 fitting snugly within the enlarged portion 15 and rendering the controlling rod compact and practically non-separable when the device is not in use.

The outer end of the controlling rod is adapted to be secured to the cheek band 2 by a strap 16 and the ring 6, the end of the rod being inserted through the ring and the strap passing through the opening 11 in the end of the tube through the ring and around the cheek band as shown in Fig. 2. The other end of the controlling rod is provided with a strap 17 passing through the openings 12 and 14 of the member 10 and the cap 13 respectively, and is secured to any rigid portion of the harness. In Fig. 1, I have shown the end as secured to the backband, but it is understood that it may be secured to any portion of the saddle or girth in order to adjust it to different horses. That is to say, in some instances it may be expedient to secure the rear end of the controlling rod to the terret in order to hold the horse's head straight, while in other instances it may be secured as low as adjacent the thills, the only thing that is necessary being that the rear end of the rod be rigidly secured to some portion of the harness which is firmly attached to the body of the horse. I preferably make the cap or socket 13 of leather, in order that the same may not injure or mar any portion of the harness to which the same may be secured.

I preferably make both members 9 and 10 of tubing and while the ends of the tubes might be left open, I prefer to make them closed. In the form of the device illustrated in the drawings, the cap 13 closes the tube 10 forming the rear end of my controlling rod, and a cork or a stopper of any suitable material is forced into or secured to the forward end of the rod. The object of closing the tubes is to prevent any accumulation of foreign matter within the controlling rod, since grit or sand between the telescoping tubes would interfere seriously with the free sliding of the same when the controlling rod is in use.

My controlling device is attached to the horse in the following manner:—The cheek band is placed in the proper position on the horse's head, and by the buckle 3 is drawn tightly in that position. The head strap is then passed upwardly behind the horse's ears and adjusted by the buckle 5, the head band operating to prevent the cheek band from slipping downwardly or becoming loose. The outer end of the controlling rod is then passed through the ring 6 on the cheek band and the strap 16 is passed back of the cheek band, then forwardly through the opening 11 of the controlling rod, over and around the end of the rod, then again back of the cheek band, and forwardly through the ring, to the buckle by which it is securely fastened. The controlling rod is then firmly secured to the body of the horse by fastening the rear end carrying the cap 13, by the strap 17, to a rigid portion of the harness, as for instance to the saddle or to the girth.

In the device constructed as above set forth, it is evident that I have provided a simple and effective means for preventing a horse from turning its head side-wise or laterally, without interfering in any way with the free motion of its head in any other direction, the telescoping tubes permitting the horse to hold its head in any position most comfortable or natural, other than in that side-wise position which greatly interferes with its speed and appearance.

Having thus described my invention, what I claim as my invention and desire to protect by Letters Patent of the United States, is:—

1. The combination with the head and body portion of a harness, of a freely extensible rod having its respective extremities connected thereto, the said extremities being secured against lateral movement.

2. The combination with the head and body portion of a harness, of a freely telescopic rod having its respective extremities connected thereto, the said extremities being secured against lateral movement.

3. The combination with a harness, of a freely extensible controlling rod having its extremities respectively connected to the cheek band and body portion of said harness, the said extremities being secured against lateral movement.

4. A controlling device for horses, comprising a freely telescopic rod, having its respective extremities connected to the cheek band and the saddle portion of the harness, the said extremities being secured against lateral movement.

5. A controlling device for horses, comprising a freely extensible rod, having its respective extremities connected to the cheek band and the saddle portion of the harness, the said extremities being secured against lateral movement.

6. In a controlling device for horses, the combination of a cheek band, a ring on said band, a telescoping rod passing through said ring, a strap secured to one end of the rod for securing said rod to said cheek band and a strap passing through the other end of the rod for securing said end to a fixed portion of the harness.

7. In a controlling device for horses, the combination of a cheek band, a ring on said band, a telescoping rod the forward end of which passes through said ring, a strap secured to said rod for holding said rod to said band, a socket at the rear end of said rod, a strap passing through said rod and socket for securing said rod to a fixed portion of the harness.

8. A controlling device for horses, comprising two freely telescoping members, each having a longitudinally elongated aperture therethrough and adjacent to its outer end, in combination with straps passing through said aperture for securing said rod to the harness.

9. A controlling device for horses comprising two freely telescoping members, one having an aperture therein, adjacent to its outer end, a cap fitted over the end of the other member, the said cap and other member having apertures therethrough near their outer ends and straps passing through said apertures.

10. In a controlling rod, the combination of two telescoping members, a cap over the end of the inner member and enlarged at its inner end, the outer member being adapted to telescope within the enlarged end of said cap and straps passing through the outer end of the outer member and through the cap and inner member.

11. In a controlling rod for horses, two telescoping tubes, the outer end of one tube being closed and provided with an opening and a strap passing through said opening, the other member being provided with a leather cap, an opening through said cap and said second member, a strap passing through said opening for holding the cap upon said second member and for attaching said second member to a rigid portion of the harness.

12. In a controlling rod for horses, the combination of two members, one of said members being provided with a cap having an enlarged inner end and the other member sliding over said member and adapted to be secured in the enlarged end of said cap.

13. In a controlling rod for horses, the combination with two telescopic members of a cap inclosing the outer extremity of one of said members and having an enlarged inner end to inclose the inner extremity of the other of said members when the rod is in its collapsed condition, each of said members being apertured adjacent to their outer ends and fastening straps passing through said apertures.

14. A controlling device for horses comprising a cheek band, a ring on said band, a rod having one end passing through said ring, a cap over the other end of said rod, and means for securing said cap to said rod and to a fixed portion of the harness.

15. A controlling device for horses comprising a cheek band, a freely extensible rod, and means to connect the rod rigidly at one end to the cheek band and at the other end to the body part of the harness.

16. The combination with a harness, of a freely telescoping rod having its extremities connected respectively to one side of the head portion and to one side of the body portion of the harness.

In witness whereof, I have hereunto set my hand this fourteenth of November, A. D. 1905.

JOHN HOWELL.

Witnesses:
O. D. SHANK,
ALSTON B. MOULTON